(12) United States Patent
Reul et al.

(10) Patent No.: US 10,393,120 B2
(45) Date of Patent: Aug. 27, 2019

(54) ELECTRIC MOTOR DRIVEN LIQUID PUMP, IN PARTICULAR FOR THE FORCED LUBRICATION OF A MANUAL TRANSMISSION FOR MOTOR VEHICLES

(71) Applicant: FTE AUTOMOTIVE GMBH & CO. KG, Ebern (DE)

(72) Inventors: Alexander Reul, Frensdorf (DE); Roland Stössel, Oberaurach (DE)

(73) Assignee: FTE automotive GmbH, Ebern (DE)

( * ) Notice: Subject to any disclaimer, the term of this patent is extended or adjusted under 35 U.S.C. 154(b) by 304 days.

(21) Appl. No.: 15/039,955

(22) PCT Filed: Sep. 23, 2014

(86) PCT No.: PCT/EP2014/002576
§ 371 (c)(1),
(2) Date: May 27, 2016

(87) PCT Pub. No.: WO2015/078541
PCT Pub. Date: Jun. 4, 2015

(65) Prior Publication Data
US 2017/0009771 A1    Jan. 12, 2017

(30) Foreign Application Priority Data
Nov. 29, 2013   (DE) .................. 10 2013 017 976

(51) Int. Cl.
*F04D 13/06* (2006.01)
*F04D 29/02* (2006.01)
(Continued)

(52) U.S. Cl.
CPC ....... *F04D 13/0606* (2013.01); *F04D 29/026* (2013.01); *F04D 29/086* (2013.01);
(Continued)

(58) Field of Classification Search
CPC .. F04D 13/0606; F04D 29/026; F04D 29/086; F04D 29/22; F04D 29/426;
(Continued)

(56) References Cited

U.S. PATENT DOCUMENTS 5,092,736 A    3/1992   Herlitzek
5,466,995 A *  11/1995  Genga ................. F04D 13/0606
                                              318/3
(Continued)

FOREIGN PATENT DOCUMENTS

CN         1252974 A      5/2000
DE       199 14 579 C2    3/2001
(Continued)

OTHER PUBLICATIONS

German Office Action, Applicant: FTE automotive GmbH, Appln. No. 10 2013 017 976.9, dated Feb. 7, 2014, 5 pages (No translation).
(Continued)

*Primary Examiner* — Philip E Stimpert
(74) *Attorney, Agent, or Firm* — Reising Ethington, P.C.

(57) ABSTRACT

An electric motor driven liquid pump, which can be used for forced lubrication of a motor vehicle manual transmission, has a housing flange-mountable on a fluid container via a flange surface. A stator including a motor winding and a magnetic rotor are incorporated in the housing for conveying liquid. The housing is formed of multiple parts including a pump housing section which has fluid inlets and outlets, a stator housing section which holds the stator and together with the pump housing section, delimits an electronics chamber in which the rotor is arranged, and a motor housing section which together with the stator housing section delimits an electronic chamber in which at least the stator is located. A sealing element seals the flange surface to the
(Continued)

fluid container, separates the fluid chamber and the electronic chamber, and seals the latter from the environment.

14 Claims, 4 Drawing Sheets (51) Int. Cl.
| | | |
|---|---|---|
| *F04D 29/08* | (2006.01) | |
| *F04D 29/22* | (2006.01) | |
| *F04D 29/42* | (2006.01) | |
| *F04D 29/60* | (2006.01) | |
| *F04D 29/62* | (2006.01) | |
| *F16H 57/04* | (2010.01) | |

(52) U.S. Cl.
CPC .......... *F04D 29/22* (2013.01); *F04D 29/426* (2013.01); *F04D 29/605* (2013.01); *F04D 29/628* (2013.01); *F16H 57/0436* (2013.01); *F16H 57/0441* (2013.01)

(58) Field of Classification Search
CPC .... F04D 29/605; F16H 7/0436; F16H 7/0441; F16J 15/00; F16J 15/02; F16J 15/021; F16J 15/06; F16J 15/062; F16J 15/061; F16J 15/064
See application file for complete search history.

(56) References Cited

U.S. PATENT DOCUMENTS

| | | |
|---|---|---|
| 5,474,428 A | 12/1995 | Kimura et al. |
| 5,785,013 A | 7/1998 | Sinn et al. |
| 6,506,034 B1 | 1/2003 | Lentz et al. |
| 6,604,917 B2 * | 8/2003 | Casper ................ F04D 13/0606 417/420 |
| 6,663,362 B1 | 12/2003 | Lentz et al. |
| 2007/0172367 A1 * | 7/2007 | Janocko .................. F04D 15/00 417/423.11 |
| 2008/0219839 A1 | 9/2008 | Pfetzer et al. |
| 2014/0377103 A1 | 12/2014 | Hoj |

FOREIGN PATENT DOCUMENTS

| | | |
|---|---|---|
| DE | 10 2005 005 154 A1 | 8/2006 |
| DE | 10 2006 012 838 A1 | 11/2006 |
| DE | 10 2007 018 504 A1 | 10/2008 |
| EP | 0 864 760 A2 | 9/1998 |
| JP | S5186807 | 7/1976 |
| JP | 2002250295 | 9/2002 |
| JP | 4438407 B2 | 3/2010 |

OTHER PUBLICATIONS

PCT Search Report and Written Opinion, Applicant: FTE automotive GmbH, Application No. PCT/EP2014/002576, dated Nov. 21, 2014, 9 pages.
International Preliminary Report on Patentability, Application No. PCT/EP2014/002576, Filing Date: Sep. 23, 2014, Applicant: FTE automotive GmbH, English translation, 6 pages.
Japanese Office Action, Applicant: FTE automotive GmbH, Application No. 2016534910, dated Jan. 30, 2018, 7 pages.
Korean Office Action, Applicant: FTE automotive GmbH, Application No. 1020167017372 dated Dec. 20, 2017, 7 Pages.
Chinese Office Action, Applicant: FTE automotive GmbH, Application No. 2018062002173750, dated Jun. 25, 2018, 13 pages.

* cited by examiner

ELECTRIC MOTOR DRIVEN LIQUID PUMP, IN PARTICULAR FOR THE FORCED LUBRICATION OF A MANUAL TRANSMISSION FOR MOTOR VEHICLES

TECHNICAL FIELD

The present invention relates to an electric motor driven liquid pump. In particular, the invention relates to a liquid pump such as used on a large scale in modern motor vehicles for the forced lubrication of manual transmissions.

A manual transmission, which is arranged in the motor vehicle in a drive train between an internal combustion engine and vehicle wheels to be driven, has a lubricant system for lubrication by a lubricant such as transmission oil, which lubricant system serves the purpose of fetching the lubricant from a lubricant sump in the transmission housing to areas to be lubricated. Included in the latter are, in particular, meshing gearwheels and bearings for rotating parts, particularly shafts and gearwheels.

In conventional lubricant systems in manual transmissions distinction is basically made between splash lubrication, in which the gearwheels 'splash' in the lubricant sump and during further rotation distribute the lubricant to the gearwheels and bearings, and forced lubrication by one or more pumps, which convey the lubricant from the lubricant sump by way of a duct system to the places to be lubricated. If forced lubrication alone is provided, i.e. none of the gearwheels intentionally dips into the lubricant sump, this is termed 'dry sump lubrication', which by comparison with splash lubrication or combined lubrication has the advantage that there is no induction of air into the lubricant by the gearwheels and thus no formation of oil foam, which can lead to disruptions in the transmission lubrication. In addition, in manual transmissions with dry sump lubrication so-called 'splash losses' impairing transmission efficiency are avoided.

PRIOR ART

Electric motor driven lubricant pumps are already used in the prior art for the lubricant system of manual transmissions with dry sump lubrication (see, for example, document DE-A-10 2005 005 154). Distinction has to be made here between lubricant systems in which the lubricant is conveyed by the pump—usually a gear pump—under pressure to nozzles, by way of which the lubricant is sprayed on the places to be lubricated, and lubricant systems with a pump—for example a centrifugal pump—by which the lubricant is merely conveyed to a distributor with a reservoir, from where the lubricant substantially free of pressure rains down or drips onto mesh zones and bearing locations. The last-mentioned, low-pressure lubricant system represents the field of pump use preferred here, in particular because it offers cost advantages by comparison with the solution involving pressure. Thus, a filter arrangement for avoidance of nozzle blockage is redundant, susceptibility to contamination is less overall, lower motor power can be provided for the electric motor, etc.

Constructional details of an electric motor driven centrifugal pump for lubricant supply of a transmission are known from, for example, document DE-A-10 2007 018 504 (FIG. 7). In this instance an electric motor and a pump driven by it form a motor/pump unit, which is arranged directly in the lubricant ('operating medium' in the terminology of this document) below a liquid level. The electric motor and the pump in this prior art lie in succession and the motor/pump unit is additionally surrounded by a duct system serving the purpose of conducting the intake flow along the surface of the electric motor, which heats up due to operation, to a suction port of the pump. An electric motor driven oil booster pump arranged within an oil pan of an automatic transmission is also known from document DE-A-10 2006 012 838 (FIG. 3c). In this prior art the pump and the electric motor lie in succession, the latter being located outside the oil pan. In that case, drive of the pump takes place mechanically by way of a shaft which passes through the wall of the oil pan and is sealed relative to this wall.

Motor/pump units of that kind usually have a multi-part housing (see, for example, document DE-A-43 42 233, FIG. 2), in which dry regions on the drive side, i.e. motor side, which serve for reception of the electrical or electronic components (motor winding, sensor system, electronic control system, etc.), also have to be liquid-tightly separated from wet regions on the conveying side, i.e. pump side. In addition, such motor/pump units are suitable for sealing relative to the environment—which in the engine bay of a motor vehicle is usually dusty and moist or oily—and/or at a flange surface for mounting on the transmission housing or the oil sump. For that purpose, use is made in the prior art of individual insert seals, in part also O-rings. These seals entail a not inappreciable assembly effort; in addition, there is the risk of slipping or migration of a seal so that leakages and possible consequential damage arise particularly on the motor side of the motor/pump unit.

What is desired is to provide particularly for forced lubrication of a manual transmission for motor vehicles, an electric motor driven liquid pump which by comparison with the prior art outlined above is to be mounted more simply and economically and then sealed more reliably.

SUMMARY OF THE INVENTION

An electric motor driven liquid pump according to one embodiment of the invention, which is usable particularly for forced lubrication of a manual transmission for motor vehicles, includes a housing, which can be flange-mounted on a liquid container by way of a flange surface external to the pump and has a liquid inlet and a liquid outlet and in which a stator having a motor winding and a magnetic rotor for conveying liquid are received. The housing is of multi-part construction with a pump housing section having the liquid inlet and the liquid outlet, a stator housing section carrying the stator and together with the pump housing section bounding a liquid chamber in which the rotor is arranged, and a motor housing section which together with the stator housing section bounds an electronics chamber and in which at least the stator is disposed. A sealing element simultaneously seals the flange surface external to the pump relative to the liquid container, separates the liquid chamber from the electronics chamber and seals the electronics chamber relative to the environment is provided.

Thus, in accordance with the invention the pump housing at the outset comprises, in a simpler and more assembly-friendly manner, only a minimum of housing components to separate wet regions of the pump from dry regions of the pump and to bound the latter overall relative to the liquid or environment/atmosphere, namely (a) the pump housing section as a boundary, which is permeable in defined manner by way of the liquid inlet and outlet, for the liquid, (b) the stator housing section as a media-separating boundary between the wet liquid chamber and the dry electronics chamber in the pump and (c) the motor housing section as a boundary relative to the rest of the environment/atmosphere. Moreover, in accordance with the invention only one, multifunctional sealing element is provided, which firstly seals relative to the liquid container at the flange surface external to the pump (i.e. 'pump external' separation between liquid and environment/atmosphere), secondly separates the liquid chamber from the electronics chamber in the pump (i.e. 'pump internal' media separation) and thirdly seals the electronics chamber relative to the environment/atmosphere (i.e. sealing against penetration of moisture or contamination of the pump).

By contrast to the prior art outlined in the introduction, a multiplicity of seal inserts is not required and does not have to be handled and the disadvantages connected therewith (e.g. assembly cost, risk of 'migration' of individual seals, etc.) are avoided without alternative measures such as, for example, sealed welding of housing components having to be provided at the housing. Since, in addition, the pump already carries the means for sealing 'external to pump', the assembly/flange-mounting of the pump at the liquid container is simplified. Overall, by comparison with the prior art a less expensive pump sealing which has more process security and thus also reliability is achieved.

In an advantageous development of the liquid pump the flange surface, which is external to the pump, of the housing can be provided with an encircling groove for receiving a first sealing section of the sealing element, which protrudes by at least one sealing lip, but preferably two sealing lips, beyond the flange surface external to the pump so as to seal relative to the liquid container. A double sealing of that kind seals in a manner which is particularly resistant to contamination and reliable. Scratches or the like at the flange surface of the liquid container can be 'bridged over', consequently, there are no special demands on cleanliness or smoothness of the flange surface.

Preferably, the arrangement is such that the pump housing section has a pump housing flange at which the flange surface external to the pump and a flange surface internal to the pump are formed at opposite sides. A flange surface internal to the pump is provided with an encircling groove for receiving a second sealing section of the sealing element. The second sealing section protrudes by two sealing lips beyond the flange surface internal to the pump, wherein—in a clearer and unique functional assignment of the sealing lips—one sealing lip co-operates with the stator housing section in order to separate the liquid chamber from the electronics chamber, while the other sealing lip co-operates with the motor housing section in order to seal the electronics chamber relative to the environment. In that case, the sealing lips can advantageously compensate for different housing thicknesses—which may differ only due to tolerances—in the flange regions of the stator housing section and the motor housing section.

In addition, the sealing element, made from an elastomeric material, can be attached to the pump housing section so that the sealing element is, in a more assembly-friendly manner, a captive component of the liquid pump. In principle, the sealing element can in that case be incorporated in or plugged onto the pump housing section. However, with respect to simple capability of production and process reliability (e.g. avoidance of assembly errors) it is preferred if the sealing element is injection-molded at the pump housing section to be interlocking.

For a reliable mechanically positive fixing of the sealing element to the pump housing section there can be provided between the encircling groove at the flange surface external to the pump and the encircling groove at the flange surface internal to the pump a plurality of openings which are spaced apart in circumferential direction and through which the elastomeric material of the sealing element is injection-molded in order to connect the first sealing section and the second sealing section of the sealing element together. The sealing element can thus advantageously be injection-molded on the pump housing section in one working step. In the case of an overlapping or a congruent arrangement of the grooves on the two sides of the pump housing flange the sealing arrangement is also a very compact construction in radial direction. Beyond that, such an arrangement, in which sealing with respect to two sides takes place approximately on one diameter, has the advantage that even in the case of relative 'soft' or flexible housing components the risk of leakages due to housing deformation is minimized.

In principle, the housing components of the liquid pump can be made from a light metal such as, for example, an aluminum alloy. However, with regard to low production costs it is preferred if the housing components are built as plastic material parts, which can be produced by injection technology, i.e. by plastic material injection molding. A screw connection, rivet connection or snap connection, for example, is conceivable for fastening the housing components to one another. However, for a particularly economical housing design it is preferred if the pump-housing and motor-housing sections produced as plastic material parts are welded together.

Moreover, the stator housing section can have, with respect to a simple and axially as well as radially positionally precise fastening in the housing of the liquid pump, a stator housing flange which is clamped in place between the pump housing section and the motor housing section and which additionally centers the stator housing section at the motor housing section with respect to the axis of rotation of the rotor.

Finally, it is preferred, especially for a particularly flat construction as seen in axial direction, if the second sealing section of the sealing element extends over a centering region between the stator housing section and the motor housing section in radial direction with respect to the axis of rotation of the rotor.

BRIEF DESCRIPTION OF THE DRAWINGS

The invention is explained in more detail in the following by way of preferred embodiments with reference to the accompanying—in part schematic—drawings, in which for simplification of the illustration elastomeric or elastic parts are illustrated in undeformed state and in which.

DETAILED DESCRIPTION OF THE EMBODIMENTS

Figures 3, 4:
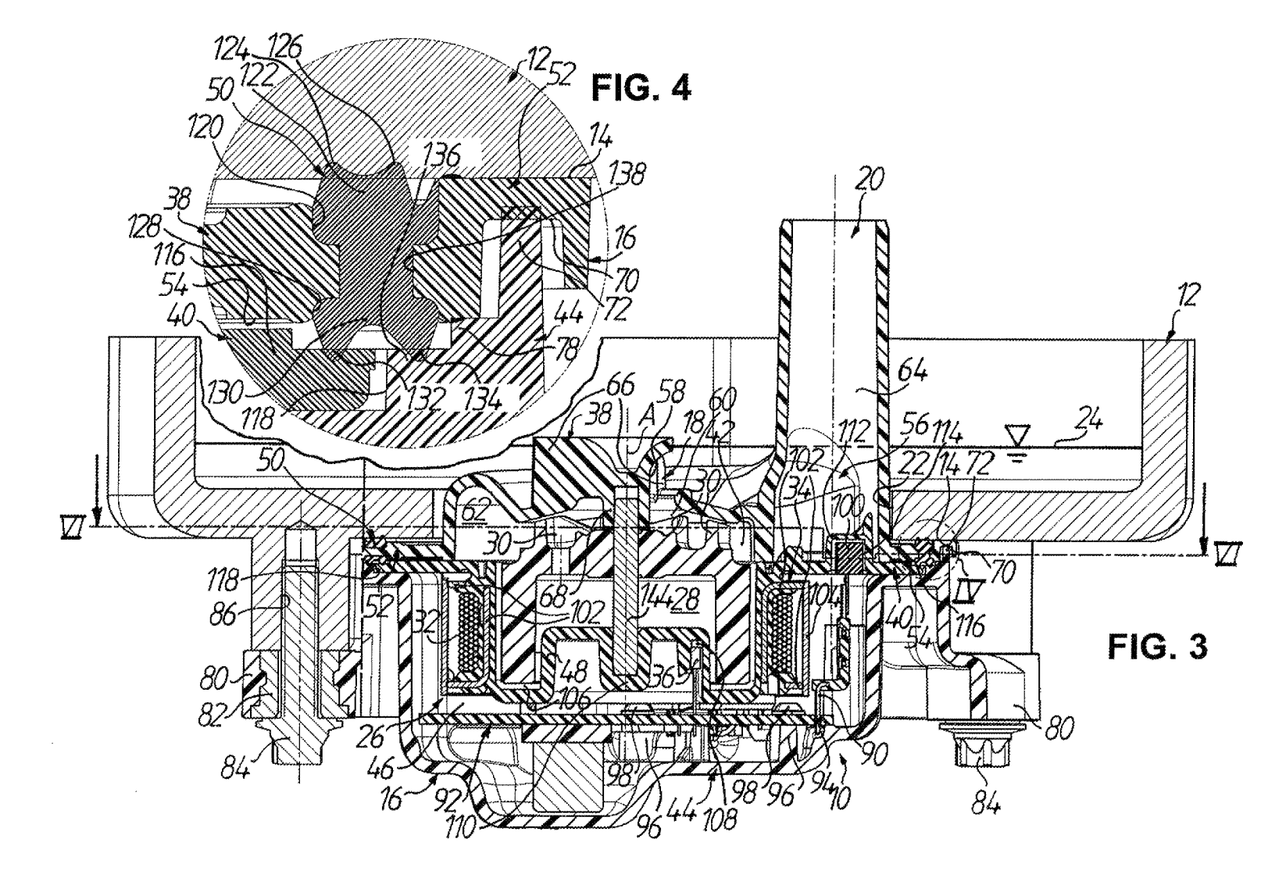
FIG. 3 shows a sectional view, which is to enlarged scale by comparison with the scale of FIG. 2, of the liquid pump according to FIG. 1 in correspondence with the doubly-stepped section line III-III in FIG. 2 in a state of mounting on a transmission housing, which is illustrated in broken-away form.
FIG. 4 shows a part sectional view, to a further enlarged scale, of the liquid pump according to FIG. 1 in correspondence with the detail circle IV in FIG. 3, for better illustration of an encircling sealing element with a triple function.

In the figures the reference numeral 10 designates in general an electric motor driven liquid pump for forced lubrication of a manual transmission for motor vehicles, of which in FIG. 3 merely a lower part, namely a transmission housing 12 (also) serving as a liquid container, is illustrated in broken-away form. The liquid pump 10 is mounted from the outside on the transmission housing 12, more precisely flange-mounted by way of a flange surface 14, which is external to the pump, of a housing 16 of the liquid pump 10, so that a liquid inlet 18 and a liquid outlet 20 of the liquid pump 10 protrude into the transmission housing 12 through an opening 22 in the transmission housing 12. Whereas the liquid inlet 18 is disposed below a transmission oil fill level, which is indicated in FIG. 3 by a horizontal line at 24, in the transmission housing 12, the liquid outlet 20 extends out at the top above the transmission oil fill level 24, where it is in fluid connection—in a way which is not shown here—with the distributor system (not illustrated) for the transmission oil.

An electronically commutated electric motor 26 is received in the housing 16 (see FIGS. 3 and 5) and comprises a substantially cup-shaped, magnetic motor 28, which is rotatable about an axis A of rotation and is provided at the end with a plurality of curved blade projections 30 (cf., in particular, FIG. 6) as means for conveying liquid, a stator 34 having a motor winding 32, and a magnetic field sensor 36—which is required in a manner known per se for the electronic commutation—for recognition of the rotational angle position of the rotor 28 (see FIG. 3). In that regard, the housing 16 is of multi-part, more precisely three-part, construction with an upper pump housing section 38, which has the liquid inlet 18 and the liquid outlet 20, a middle stator housing section 40, which carries the annular stator 34 so that this at least partly surrounds the rotor 28 in coaxial arrangement with respect to the axis A of rotation as seen along the axis A of rotation and bounds together with the pump housing section 38 a liquid chamber 42 in which the rotor 28 is arranged by its blade projections 30, and a lower motor housing section 44, which together with the stator housing section 40 bounds an electronics chamber 46 in which, inter alia, the stator 34 is located.

In a particularly compact embodiment the stator housing section 40 extends, as seen along the axis A of rotation, into the rotor 28 by a housing offset 48, which is constructed for reception of the magnetic field sensor 36. In addition, as will be similarly described in more detail in the following, a sealing element 50 is provided at the housing 16, which sealing element in a triple function simultaneously seals at the flange surface 14, which is external to the pump, of the housing 16 relative to the transmission housing 12, separates the liquid chamber 42 from the electronics chamber 46 and seals the electronics chamber 46 with respect to the environment.

Figure 5:
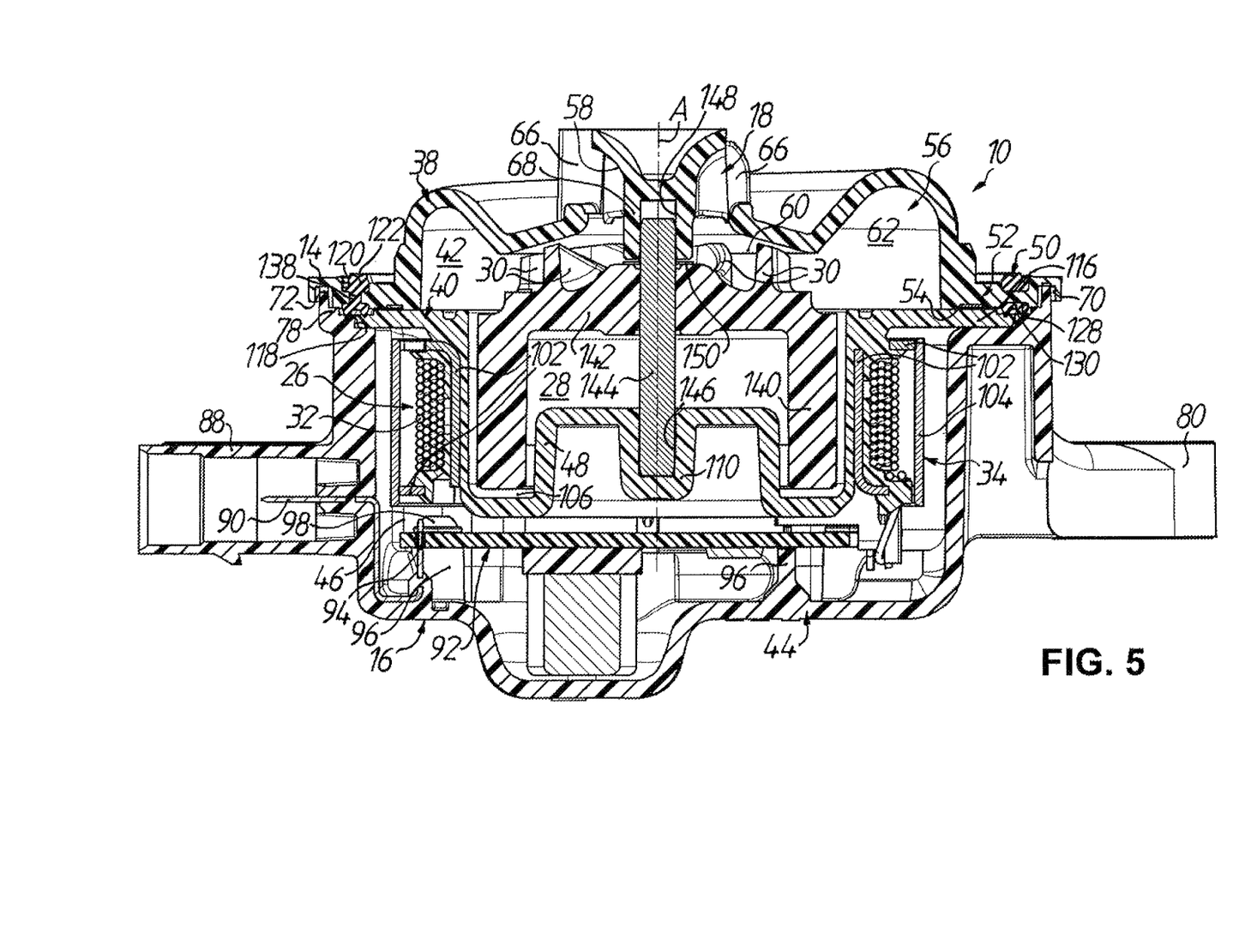
FIG. 5 shows a sectional view, which is to enlarged scale by comparison with the scale of FIG. 2, of the liquid pump according to FIG. 1 in correspondence with the section line V-V in FIG. 2.
Figure 6:
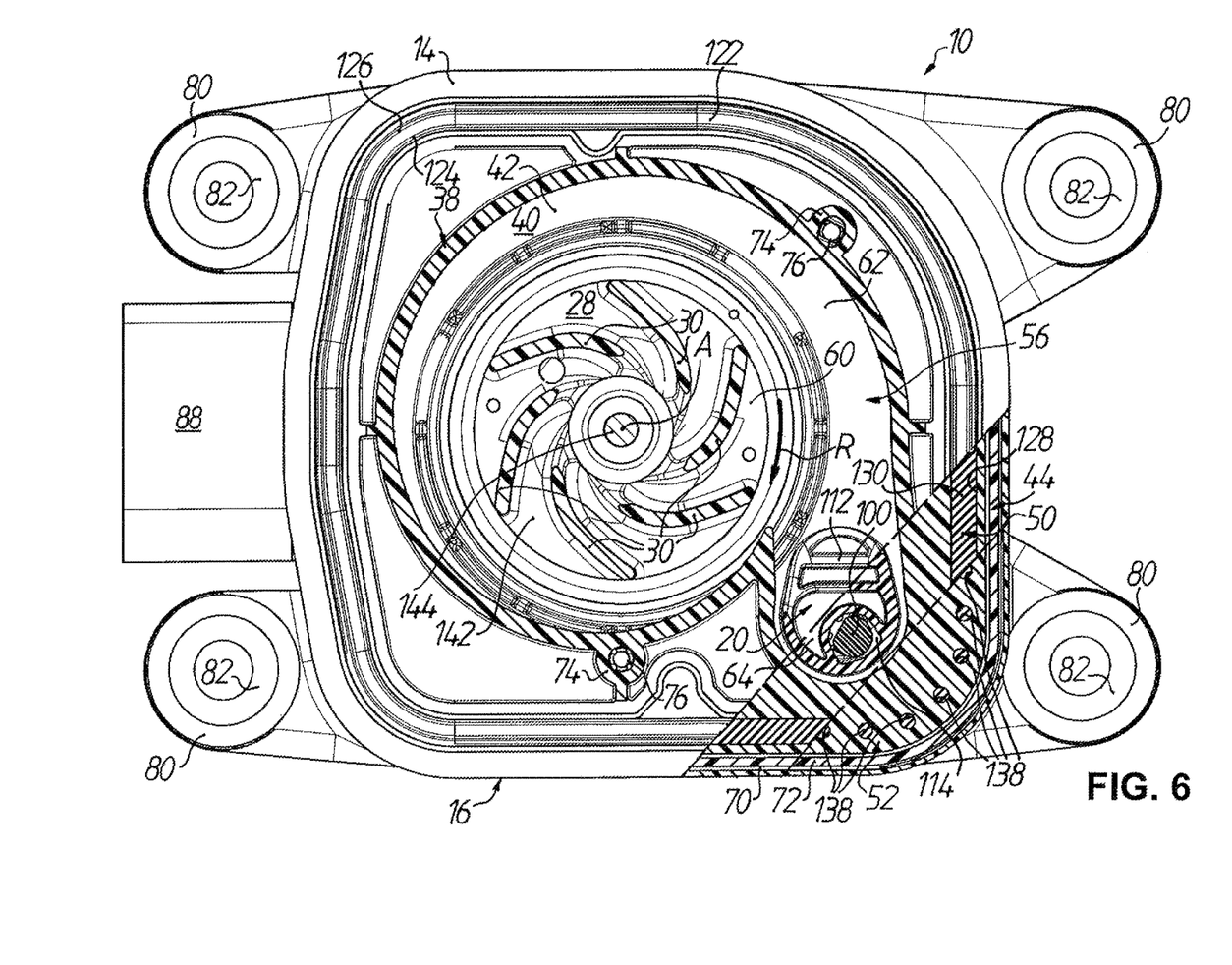
FIG. 6 shows a sectional view, which is to enlarged scale by comparison with the scale of FIG. 3, of the liquid pump according to FIG. 1 in correspondence with the doubly-stepped section line VI-VI in FIG. 3, but by contrast to FIG. 3 in non-mounted state, i.e. without transmission housing and fastening means.

Further details with respect to the pump housing section 38, which is constructed as a plastic material part from a laser-transparent, glass-fiber-reinforced polyphthalamide (PPA 35 GF), can be inferred from, in particular FIGS. 3, 5 and 6. Accordingly, the pump housing section 38 has, radially outwardly, a pump housing flange 52 at which the flange surface 14 external to the pump and the flange surface 54 internal to the pump are formed on opposite sides. The sealing element 50 made from an elastomeric material is secured to the pump housing flange 52 of the pump housing section 38 in a manner still to be described.

The pump housing section 38 is formed with a dome-like elevation radially within the pump housing flange 52 and bounds, in part together with the rotor 28 and the stator housing section 40, in the region of the liquid chamber 42 a pump channel 56 which can be substantially divided into four regions, namely—as seen in direction from radially inwardly to radially outwardly first, a central, i.e. centered with respect to the axis A of rotation, substantially funnel-shaped inlet region 58 (see, in particular, FIG. 5), second, a central substantially annular acceleration region 60 in which the blade projections 30 of the rotor 28 move in operation of the liquid pump 10, and third, a substantially screw-shaped conveying region 62 (see, for this purpose, also FIGS. 1 and 2), which finally opens into fourth, a tubular outlet region 64 which extends adjacent to the pump housing flange 52 substantially parallel to the axis A of rotation. The substantially funnel-shaped inlet region 58, which axially protrudes relative to the central acceleration region 60 of the pump channel 56, forms the liquid inlet 18 of the housing 16 at the outer circumferential side, which inlet is thus oriented substantially transversely to the axis A of rotation at the rotor 28 and by way of which—as can be best seen in FIGS. 1 and 2—the liquid (here the transmission oil) can run into the liquid pump 10 over almost the full circumference (approximately 360°), i.e. interrupted only by three webs 66 extending in radial direction. In the funnel-shaped inlet region 58 the liquid then undergoes a flow deflection through 90° (from radially in the direction of the axis A of rotation to axially along the axis A of rotation) until it impinges on the rotor 28 with its blade projections 30, where a further flow deflection through approximately 90° takes place (from axially along the axis A of rotation to radially away from the axis A of rotation). In the central acceleration region 60 of the pump channel 56, which as seen in section (FIGS. 3, 5) is bounded on opposite sides in axial direction by the pump housing section 38 and the rotor 28 to have an approximately constant flow cross-section, the liquid is then as a consequence of the shape of the blade projections 30 accelerated radially outwardly and in circumferential direction in correspondence with the rotational direction R of the rotor 28 (see FIG. 6), after which it passes into the substantially screw-shaped conveying region 62. In the conveying region 62 of the pump channel 56, which is bounded on one axial side by (at the start) the rotor 28 and the stator housing section 40 and on the other axial side as well as at the circumference by the pump housing section 38 to have a flow cross-section increasing in correspondence with the course of the screw as seen in rotational direction R, the liquid is then conveyed substantially in circumferential direction to the tubular outlet region 64. At the start of the outlet region 64 a flow deflection of the liquid through approximately 90° (from substantially in circumferential direction to axially parallel to the axis A of rotation) then takes place once again, after which the liquid flows along the constant circular flow cross-section of the outlet region 64 in order to finally be delivered by the liquid pump 10 by way of the liquid outlet 20 formed by the outlet region 64.

According to FIGS. 3 and 5 the pump housing section 38 additionally has at a central zone, i.e. adjoining the inlet region 58, a bearing projection 68 for mounting—which is still to be described—the rotor 28. So far as the connection of the injection-molded pump housing section 38 with the other parts of the housing 16 is concerned, it must finally be mentioned with respect to the pump housing section 38 that the pump housing flange 52 is provided radially outwardly of the flange surface 54 internal to the pump and adjoining this with an encircling groove 70 for receiving an encircling collar 72, which is formed to be substantially complementary as seen in plan view, at the motor housing section 44. Moreover, the pump housing section 38 has, according to FIGS. 1, 2 and 6, mounts (in FIG. 6 with a dowel centrally at the bottom and a slot at the top right) at 74 for positioning pins 76 (again see FIG. 6) formed at the stator housing section 40, which pins serve the purpose of aligning the stator housing section 40 with respect to the pump housing section 38.

The motor housing section 44, which is similarly injection-molded as a plastic material part from a glass-fiber reinforced polyphthalamide (e.g. PPA 50 GF), is laser-welded to the pump housing section 38—suitably aligned indirectly by way of the stator housing section 40—and in particular with its collar 72 encircling in the groove 70 of the pump housing flange 52 (indicated in FIG. 4 by the cross-hatching at the base of the groove 70). In that case, according to FIGS. 4 and 5 the pump housing section 38 is supported by way of the flange surface 54, which is internal to the pump, of the pump housing flange 52 on an encircling shoulder 78, which adjoins the collar 72 radially inwardly, of the motor housing section 44.

In the illustrated embodiment the motor housing section 44 has, radially outwardly, four fastening eyes 80 which are each lined by a metallic sleeve 82 encapsulated in interlocking manner by injection-molding. As illustrated in FIG. 3, the sleeves 82 in the mounted state of the liquid pump 10 are penetrated by cap screws 84, which are screwed into respectively associated threaded bores 86—which are distributed around the opening 22—in the transmission housing 12 in order to attach the liquid pump 10 from the outside to the transmission housing 12 and in that case to also firmly connect the individual parts of the housing 16 together. On the other hand, the weld connection between pump housing section 38 and motor housing section 44 as discussed above serves primarily as securing during transport.

Figure 1:
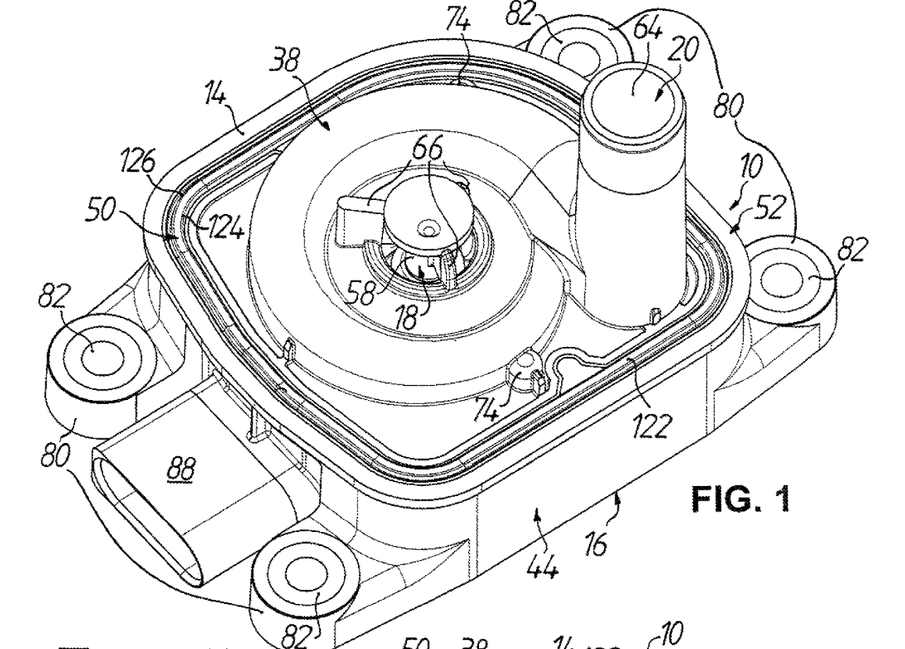
FIG. 1 shows a perspective view of an electric motor driven liquid pump according to a preferred embodiment of the invention, in non-mounted state, obliquely from above and the left front with a view onto a flange surface, which is external to the pump, for fastening to a liquid container such as, for example, a transmission housing.
Figure 2:
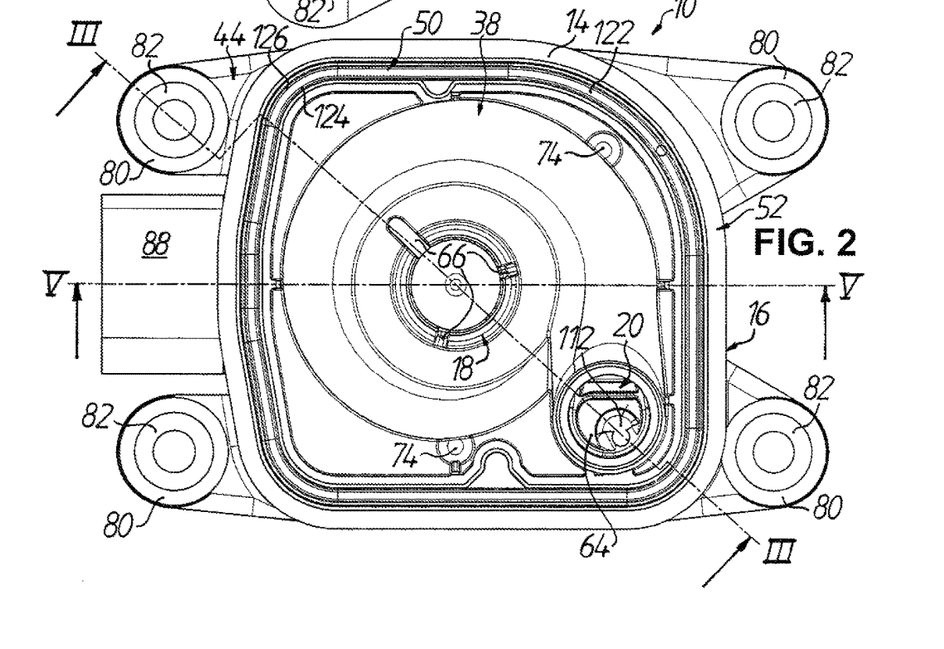
FIG. 2 shows a plan view of the liquid pump according to FIG. 1, from above in FIG. 1.

The motor housing section 44 is provided between the fastening eyes 80 on the left in FIGS. 1, 2 and 6 with a plug collar 88 for an electric terminal of the liquid pump 10. In this respect, there can be seen in the section according to FIG. 5 by way of example that electrical conductors 90 are let into or injection-molded in the motor housing section 44, which conductors extend from the region of the plug collar 88 into the electronics chamber 46. The sectional views according to FIGS. 4 and 5 also show that an electronic circuit board 92 with electronic components, which are known per se and necessary for the pump control, is integrated in the electronics chamber 46 of the housing 16. The electronic circuit board 92 itself is contacted relative to the electrical conductors 90 in the motor housing section 44 by way of press-fit connections, of which in FIG. 5 one connection is shown at 94, and is supported on projections 96, which are internally formed at the motor housing section 44 and to which the electronic circuit board 92 is additionally attached, in part by screws 98. Analogously to the positioning pins 76 for the pump housing section 38, the stator housing section 40 also has positioning pins (not able to be seen here), which are at the bottom in FIGS. 3 and 5 and which engage in associated holes (dowel hole and slot; not shown in the figures) in the motor housing section 44 and in that case extend through corresponding holes (not illustrated) in the electronic circuit board 92. The electrical parts of the liquid pump 10 are similarly contacted by way of press-fit connections 94 relative to the electronic circuit board 92; of those, there is shown in FIG. 3 by way of example merely the press-fit connection 94 for a further electrical conductor 90, which is let into or injection-molded in the stator housing section 40 and with which a temperature sensor 100 is connected. Corresponding electrical connections (not illustrated in more detail) are present for the motor winding 32 and for the magnetic field sensor 36.

The stator housing section 40 is also injection-molded as a plastic material part from a glass-fiber-reinforced polyphthalamide (e.g. PPA 50 GF). In that regard, not only the said electrical conductors 90, but also the pole sheets 102 of the stator 34 are embedded by injection-molding encapsulation by the plastics material of the stator housing section 40. Only after the injection-molding process is the motor winding 32 mounted, which is economically constructed as an orthogonal layer winding. The stator 34 is completed by a slotted (not shown) metallic ground ring 104, which is drawn with friction fit onto radially outwardly protruding edges of the pole sheets 102 and in addition connected by crimping with the edges of the pole sheets 102 (not visible in the figures).

The region, which carries the stator 34, of the stator housing section 40 surrounds the central housing offset 48 of the stator housing section 40 in coaxial positional relationship with respect to the axis A of rotation while leaving an annular space 106 into which the rotor 28 enters. According to FIG. 3, the housing offset 48 is provided, at a radially outwardly disposed position thereof, with a recess 108, which is open towards the motor housing section 44, for reception of the magnetic field sensor 36, which can be, for example, a Hall element. According to FIGS. 3 and 5, a further bearing projection 110 for journaling the rotor 28 is provided at the housing offset 48 of the stator housing section 40 on the side remote from the pump housing section 38.

According to FIGS. 2, 3 and 6, in addition a sub-region 112 of the stator housing section 40 protrudes, as seen in radial direction, adjacent to the stator 34 and axially in direction of the pump housing section 38 in ramp-like manner beyond the rest of the stator housing section 40 and thus forms a gradual transition, which reduces power losses, between the screw-shaped conveying region 62 and the tubular outlet region 64 of the pump channel 56. According to FIGS. 3 and 6 this sub-region 112 of the stator housing section 40 is provided with a receiving recess 114, which is open towards the motor housing section 44, for the temperature sensor 100 so that the latter is integrated in the housing 16 of the liquid pump 10 near the liquid outlet 20.

Finally, the stator housing section 40 has, radially outwardly, a stator housing flange 116 which is clamped in place in sandwich-like manner between the pump housing section 38 and the motor housing section 44 and which radially centers the stator housing section 40 in an associated step 118 at the motor housing section 44 with respect to the axis A of rotation.

Further details with respect to the encircling sealing element 50, which for simplification of the illustration is shown undeformed, are illustrated in FIGS. 4 and 6. According to those, the pump housing flange 52 of the pump housing section 38 starting from the flange surface 14, which is external to the pump, of the housing 16 is provided with an encircling depression or groove 120 for reception of a first sealing section 122 of the sealing element 50, which protrudes by two sealing lips 124, 126, i.e. a radially inner sealing lip 124 and a radially outer sealing lip 126, beyond the flange surface 14 external to the pump so as to provide sealing relative to the transmission housing 12. Moreover, the pump housing flange 52 starting from the flange surface 54 internal to the pump is provided with a further encircling depression or groove 128 for receiving a second sealing section 130 of the sealing element 50. The latter protrudes by two sealing lips 132, 134 beyond the flange surface 54 internal to the pump, of which one, radially inner sealing lip 132 co-operates with the stator housing flange 116 of the stator housing section 40 so as to separate the liquid chamber 42 from the electronics chamber 46. The other, radially outer sealing lip 134, thereagainst, co-operates with an associated shoulder 136 of the motor housing section 44 so as to seal off the electronics chamber 46 from the environment. In that case, the second sealing section 130 of the sealing element 50 extends over or covers the central region between the stator housing flange 116 of the stator housing section 40 and the step 118 at the motor housing section 44 in radial direction with respect to the axis A of rotation of the rotor 28, in which case as a consequence of deformation of the sealing lips 132, 134 a defined biasing force is also produced between the individual parts of the housing 16.

In the illustrated embodiment the sealing element 50 is injection-molded at the pump housing flange 52 of the pump housing section 38 to be interlocking. For that purpose, formed in the pump housing flange 52 between the encircling groove 120 at the flange surface 14 external to the pump and the encircling groove 128 at the flange surface 54 internal to the pump is a plurality of openings 138, which are preferably uniformly spaced apart in the circumferential direction, i.e. as seen along the grooves 120, 128, and which connect the grooves and are penetrated by the elastomeric material of the sealing element 50 by injection molding so as to interconnect the first sealing section 122 and the second sealing section 130 of the sealing element 50 by way of a material bond.

Finally, further details with respect to the rotor 28 and the mounting thereof in the housing 16 are shown by, in particular, FIG. 5. The rotor 28 has a permanently magnetic outer cylinder section 140, which co-operates in a manner known per se with the motor winding 32 of the stator 34, as well as a base section 142 constructed as an impeller with the blade projections 30 on the side remote from the housing offset 48 of the stator housing section 40, and is made from a magnetic material which is incorporated in plastic material and which is directly injection-molded on a metallic (preferably steel) rotor shaft 144, which is rotatably mounted in the housing 16, with conjunctive formation of the blade projections 30. The rotor shaft 144 is journaled radially directly, i.e. without bearing bushes or the like, in the housing 16 on either side of the base section 142, namely on the one hand in a cylindrical recess 146 at the bearing projection 110 in the housing offset 48 of the stator housing section 40 and on the other hand in a cylindrical recess 148 at the bearing projection 68 of the pump housing section 38. In that regard, the rotor shaft 144 is supported in FIG. 5 axially at the bottom, i.e. at the end, on the base of the recess 146 in the bearing projection 110. In FIG. 5 at the top a thrust washer surrounding the rotor shaft 144 can be provided between the base section 142 of the rotor 28 and the bearing projection 68, by way of which washer the rotor 28 is axially supported, in operation of the liquid pump 10, at the bearing projection 68 when the rotor 28 is raised against gravitational force due to the pressure conditions arising thereat.

An electric motor driven liquid pump, which is usable for forced lubrication of a motor vehicle manual transmission, includes a housing, which can be flange-mounted on a liquid container by way of a flange surface and has a liquid inlet and outlet and in which a stator having a motor winding and a magnetic rotor for liquid conveying are received. The housing is in that case of multi-part construction with a pump housing section which has the liquid inlet and outlet, a stator housing section which carries the stator and together with the pump housing section bounds a liquid chamber in which the rotor is arranged, and a motor housing section which together with the stator housing section bounds an electronics chamber in which at least the stator is disposed. In addition a sealing element is provided, which simultaneously seals at the flange surface relative to the liquid container, separates the liquid chamber and the electronics chamber and seals the latter relative to the environment so that the liquid pump overall is simple and economic to mount and then reliably sealed.

Variations and modifications are possible without departing from the scope and spirit of the present invention as defined by the appended claims.

We claim:

1. A liquid pump driven by an electric motor, comprising a housing, which has a flange surface external to the pump for mounting on a liquid container and in which a stator of the electric motor having a motor winding and a magnetic rotor for conveying liquid are received, the housing having a multi-part construction with a pump housing section which has the a liquid inlet and a liquid outlet, a stator housing section which carries the stator and together with the pump housing section bounds a liquid chamber in which the rotor is arranged, and a motor housing section which together with the stator housing section bounds an electronics chamber in which at least the stator is disposed, and wherein a unitary sealing element is provided, which simultaneously seals at the flange surface external to the pump by contacting the flange surface and the liquid container, separates the liquid chamber from the electronics chamber and seals the electronics chamber relative to the environment.

2. A liquid pump driven by an electric motor according to claim 1, wherein the flange surface, which is external to the pump, of the housing is provided with an encircling groove for reception of a first sealing section of the sealing element, which protrudes by two sealing lips beyond the flange surface external to the pump so as to seal relative to the liquid container.

3. A liquid pump driven by an electric motor according to claim 1, wherein the sealing element made from an elastomeric material is attached to the pump housing section.

4. A liquid pump driven by an electric motor according to claim 1, wherein the pump housing section and the motor housing section are plastic material parts and are welded together.

5. A liquid pump driven by an electric motor according to claim 1, wherein the stator housing section has a stator housing flange which is clamped in place between the pump housing section and the motor housing section and centers the stator housing section at the motor housing section with respect to an axis of rotation of the rotor.

6. A liquid pump driven by an electric motor comprising a housing, which has a flange surface external to the pump for mounting on a liquid container and in which a stator of the electric motor having a motor winding and a magnetic rotor for conveying liquid are received, the housing having a multi-part construction with a pump housing section which has a liquid inlet and a liquid outlet, a stator housing section which carries the stator and together with the pump housing section bounds a liquid chamber in which the rotor is arranged, and a motor housing section which together with the stator housing section bounds an electronics chamber in which at least the stator is disposed, and wherein a sealing element is provided, which simultaneously seals at the flange surface external to the pump between the flange surface external to the pump and the liquid container, separates the liquid chamber from the electronics chamber and seals the electronics chamber relative to the environment, wherein the flange surface, which is external to the pump, of the housing is provided with an encircling groove for reception of a first sealing section of the sealing element, which protrudes by two sealing lips beyond the flange surface external to the pump so as to seal relative to the liquid container; and wherein the pump housing section has a pump housing flange at which the flange surface external to the pump and a flange surface internal to the pump are formed on opposite sides, the flange surface internal to the pump being provided with an encircling groove for reception of a second sealing section of the sealing element, which protrudes by two sealing lips beyond the flange surface internal to the pump, one sealing lip of the second sealing section co-operating with the stator housing section so as to separate the liquid chamber from the electronics chamber and the other sealing lip of the second sealing section co-operating with the motor housing section so as to seal the electronics chamber relative to the environment.

7. A liquid pump driven by an electric motor according to claim 6, wherein the sealing element made from an elastomeric material is attached to the pump housing section.

8. A liquid pump driven by an electric motor according to claim 7, wherein a plurality of openings spaced apart in a circumferential direction is provided between the encircling groove at the flange surface external to the pump and the encircling groove at the flange surface internal to the pump, the elastomeric material of the sealing element being injection-molded through the openings so as to interconnect the first sealing section and the second sealing section of the sealing element.

9. A liquid pump driven by an electric motor according to claim 8, wherein the pump housing section and the motor housing section are plastic material parts and are welded together.

10. A liquid pump driven by an electric motor according to claim 9, wherein the stator housing section has a stator housing flange which is clamped in place between the pump housing section and the motor housing section and centers the stator housing section at the motor housing section with respect to an axis of rotation of the rotor.

11. A liquid pump driven by an electric motor according to claim 10, wherein the second sealing section of the sealing element extends over a centering region between the stator housing section and the motor housing section in a radial direction with respect to the axis of rotation of the rotor.

12. A liquid pump driven by an electric motor, comprising a housing, which has a flange surface external to the pump for mounting on a liquid container and in which a stator of the electric motor having a motor winding and a magnetic rotor for conveying liquid are received, the housing having a multi-part construction with a pump housing section which has a liquid inlet and a liquid outlet, a stator housing section which carries the stator and together with the pump housing section bounds a liquid chamber in which the rotor is arranged, and a motor housing section which together with the stator housing section bounds an electronics chamber in which at least the stator is disposed, and wherein a sealing element is provided, which simultaneously seals at the flange surface external to the pump between the flange surface external to the pump and the liquid container, separates the liquid chamber from the electronics chamber and seals the electronics chamber relative to the environment, and wherein the pump housing section has a pump housing flange at which the flange surface external to the pump and a flange surface internal to the pump are formed on opposite sides, the flange surface internal to the pump being provided with an encircling groove for reception of a sealing section of the sealing element, which protrudes by two sealing lips beyond the flange surface internal to the pump, one sealing lip co-operating with the stator housing section so as to separate the liquid chamber from the electronics chamber and the other sealing lip co-operating with the motor housing section so as to seal the electronics chamber relative to the environment.

13. A liquid pump driven by an electric motor according to claim 12, wherein the sealing section of the sealing element extends over a centering region between the stator housing section and the motor housing section in a radial direction with respect to an axis of rotation of the rotor.

14. A liquid pump driven by an electric motor, comprising a housing, which has a flange surface external to the pump for mounting on a liquid container and in which a stator of the electric motor having a motor winding and a magnetic rotor for conveying liquid are received, the housing having a multi-part construction with a pump housing section which has a liquid inlet and a liquid outlet, a stator housing section which carries the stator and together with the pump housing section bounds a liquid chamber in which the rotor is arranged, and a motor housing section which together with the stator housing section bounds an electronics chamber in which at least the stator is disposed, and wherein a sealing element is provided, which simultaneously seals at the flange surface external to the pump between the flange surface external to the pump and the liquid container, separates the liquid chamber from the electronics chamber and seals the electronics chamber relative to the environment; wherein the flange surface, which is external to the pump, of the housing is provided with an encircling groove for reception of a first sealing section of the sealing element, which protrudes by two sealing lips beyond the flange surface external to the pump so as to seal relative to the liquid container; and wherein a plurality of openings spaced apart in circumferential direction is provided between the encircling groove at the flange surface external to the pump and the encircling groove at the flange surface internal to the pump, an elastomeric material of the sealing element being injection-molded through the openings so as to interconnect the first sealing section and a second sealing section of the sealing element.

* * * * *